March 16, 1954 J. K. MILLS ET AL 2,672,604

TELEPHONE RINGING POWER PLANT

Filed Dec. 12, 1952 5 Sheets-Sheet 1

INVENTORS J. K. MILLS
W. S. ROSS
BY John E. Cassidy
ATTORNEY

INVENTORS J. K. MILLS
W. S. ROSS
BY John E. Cassidy
ATTORNEY

March 16, 1954 J. K. MILLS ET AL 2,672,604

TELEPHONE RINGING POWER PLANT

Filed Dec. 12, 1952 5 Sheets-Sheet 3

INVENTORS J. K. MILLS
W. S. ROSS
BY John E. Cassidy
ATTORNEY

March 16, 1954 J. K. MILLS ET AL 2,672,604

TELEPHONE RINGING POWER PLANT

Filed Dec. 12, 1952 5 Sheets-Sheet 4

INVENTORS J. K. MILLS
W. S. ROSS
BY John E Cassidy
ATTORNEY

March 16, 1954 J. K. MILLS ET AL 2,672,604

TELEPHONE RINGING POWER PLANT

Filed Dec. 12, 1952 5 Sheets-Sheet 5

INVENTORS J. K. MILLS
W. S. ROSS
BY John E. Cassidy
ATTORNEY

Patented Mar. 16, 1954 2,672,604

UNITED STATES PATENT OFFICE 2,672,604

TELEPHONE RINGING POWER PLANT

John K. Mills, Morristown, N. J., and Walter S. Ross, Port Washington, N. Y., assignors to Bell Telephone Laboratories, Incorporated, New York, N. Y., a corporation of New York Application December 12, 1952, Serial No. 325,633

12 Claims. (Cl. 340—346)

Figures 1, 6, 7:
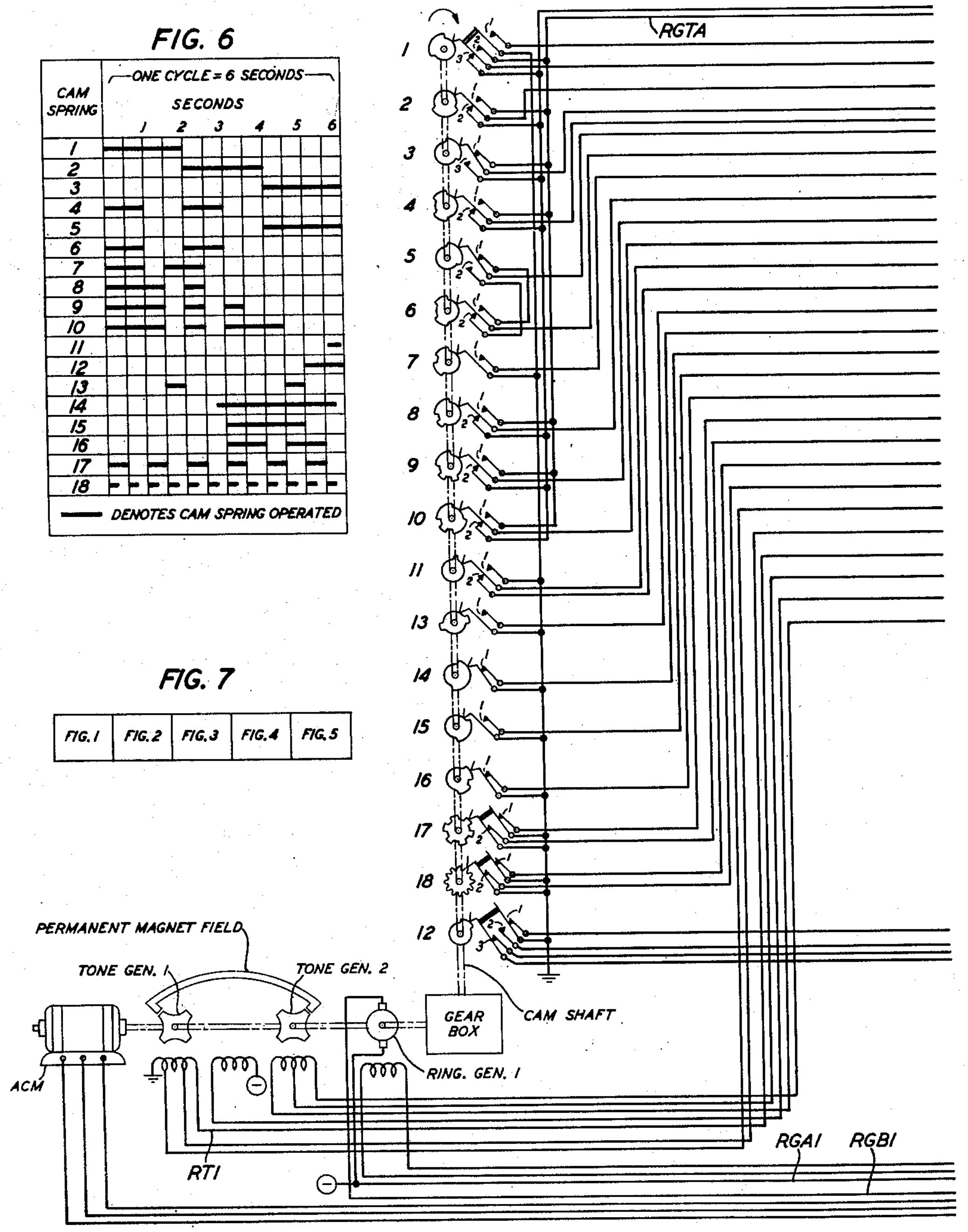

This invention is an improved transfer circuit for transferring one of two generators to the load carrying condition upon the failure of the other, or for maintenance purposes.

More particularly, this invention is an improved transfer circuit for a primary and secondary ringing supply for a communication plant. The system comprises two ringing sets, each comprising an alternating-current generator, which supplies ringing current for ringing the subscriber telephone sets, comprises also alternating tone generators for producing various tones, such as dial tone, trouble tone, etc., and a number of interrupters for interrupting the ringing current and tones in accordance with various timing cycles for code ringing, etc. The sets may be equipped with motors of different kinds. A particular one of the ringing sets will ordinarily be connected to the common load circuit. The second set will ordinarily be held in reserve for service should the set which ordinarily carries the load fail.

The present invention consists in improved transfer controls for switching one or the other of the ringing sets into the load carrying condition. Each of the ringing sets is driven by an individual motor. The invention may be applied to generators driven by any kind of individual motor. In the present illustrative embodiment, as is usual in a communication plant, the motor which drives the primary ringing alternator set is supplied with power from commercial service which is illustrated as an alternating-current supply which may, for instance, be 208- to 230-volt, 3-phase, 60-cycle. The motor, which drives the reserve alternator, is illustrated as a direct-current motor driven from the storage batteries ordinarily provided in a telephone office. Each ringing machine may be, for instance, a 20-cycle alternating-current generator running at approximately 1200 revolutions per minute. Each ringing set is provided with a tone alternator capable of producing a 600-cycle tone modulated at 120 cycles and a 500-cycle tone. Coupled to the motor shaft, of each machine, through a speed reduction gear train is a low-speed cam shaft, which may be equipped with as many as 26 cams, each operating a set of springs, to provide the ringing and signaling interruptions, as required by the office and as predetermined by the cutting of the individual cams.

An object of the invention is the improvement of transfer circuits for transferring one or another of two generators to the load carrying condition.

A more particular object of the invention is the improvement of transfer circuits for transferring one or another of two alternating-current ringing sets to the load carrying condition in the communication plant.

A feature of the invention is an arrangement which discriminates between a transfer due to the failure of the input commercial power service and a transfer due to a high or low output voltage condition.

Another feature of the invention is an arrangement which, after a complete failure of the commercial power service and its resumption thereafter, retransfers the commercial power service driven set to the load carrying condition, but which does not retransfer it if the failure were due to high or low output voltage, so that the difficulty causing either of the latter two conditions may be corrected.

Another feature of the invention is an arrangement for insuring that the commercial power driven set stops temporarily in its end-of-code ringing cycle position, after the commercial power service is restored, so that when restored to the load carrying condition it will start in the proper position at the beginning of a subsequent code ringing cycle.

Another feature of the invention is an arrangement for stopping either the commercial power driven set or the battery driven set in its end-of-code cycle position by applying dynamic braking to the 20-cycle generator output and then, after a short interval, disconnecting the generator field to prevent overheating.

Another feature is an arrangement for permitting a transfer from the battery driven set to the commercial power driven set, only when each machine is in its end-of-code cycle position.

Another feature of the invention is an arrangement for preventing an automatic transfer to the battery driven set when the battery driven set is out of service or being run for maintenance.

Another feature of the invention is an arrangement for maintaining the commercial power driven set connected to the load when the battery driven set is out of service or being run for maintenance, even though the voltage of the commercial power driven set becomes low.

Another feature of the invention is a time delay circuit which measures an interval sufficient to permit the vacuum tubes in the voltage regulator to warm up, provides means for stopping the commercial power driven set in its end-of-code cycle position and then permits the battery driven set to reach its end-of-cycle position, before transferring the load back to the commercial power driven set.

The manner in which the present circuit operates may be understood from the following detailed description when read with reference to the associated drawing which, taken together, disclose a preferred embodiment of the invention.

It is to be understood, however, that the invention is not limited to the present embodiment, but may take other forms which will be readily suggested to those skilled in the art from a consideration of the following.

Figure 2:
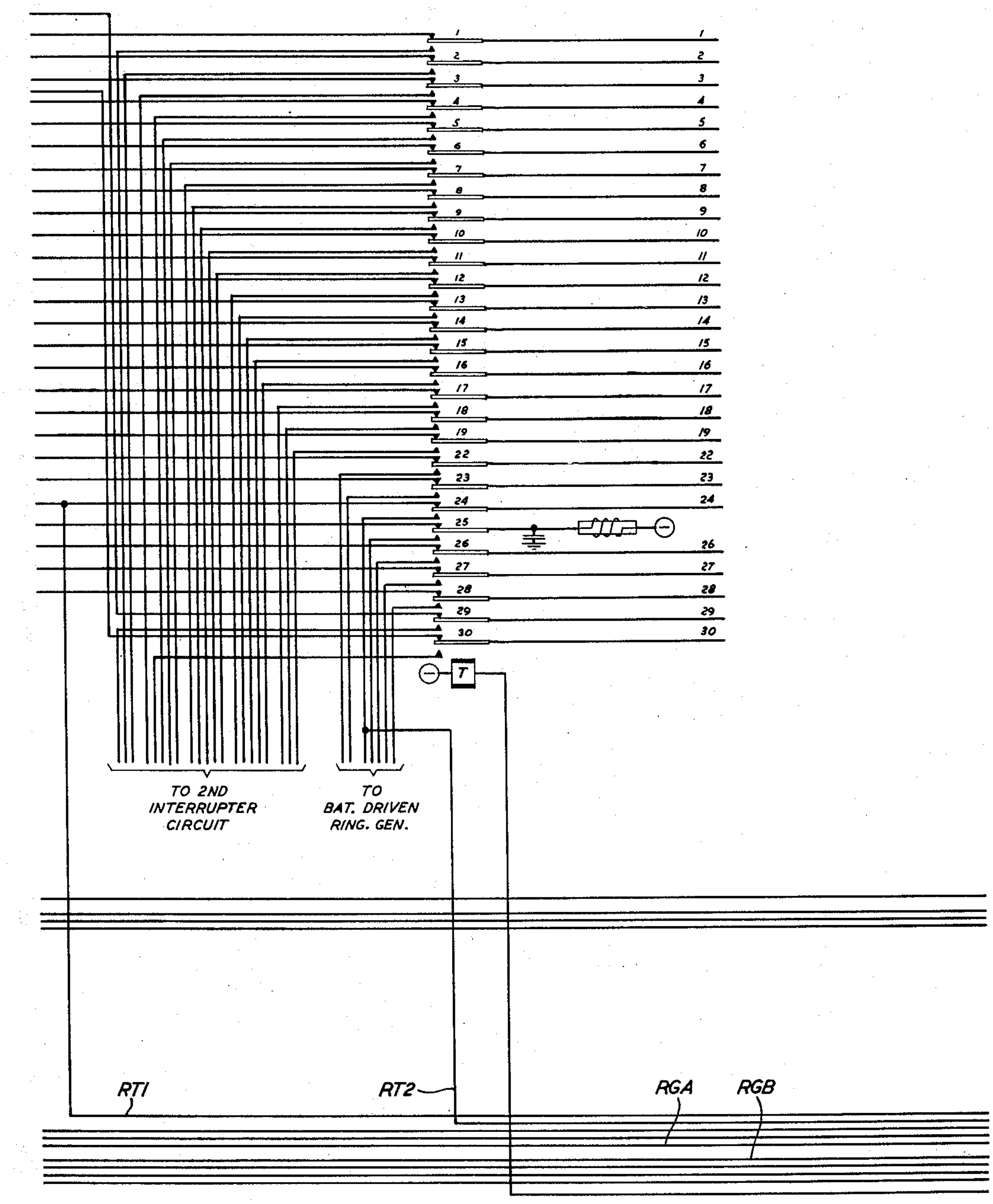

In the drawings:

Fig. 1 discloses the alternating-current motor driven ringing generator, the tone generators and the interrupters;

Fig. 2 discloses the leads to the common load circuit and the transfer relay which switches the interrupter circuit of the commercial power service motor driven ringing generator or of the battery motor driven ringing generator to the common load circuit.

Figure 3:
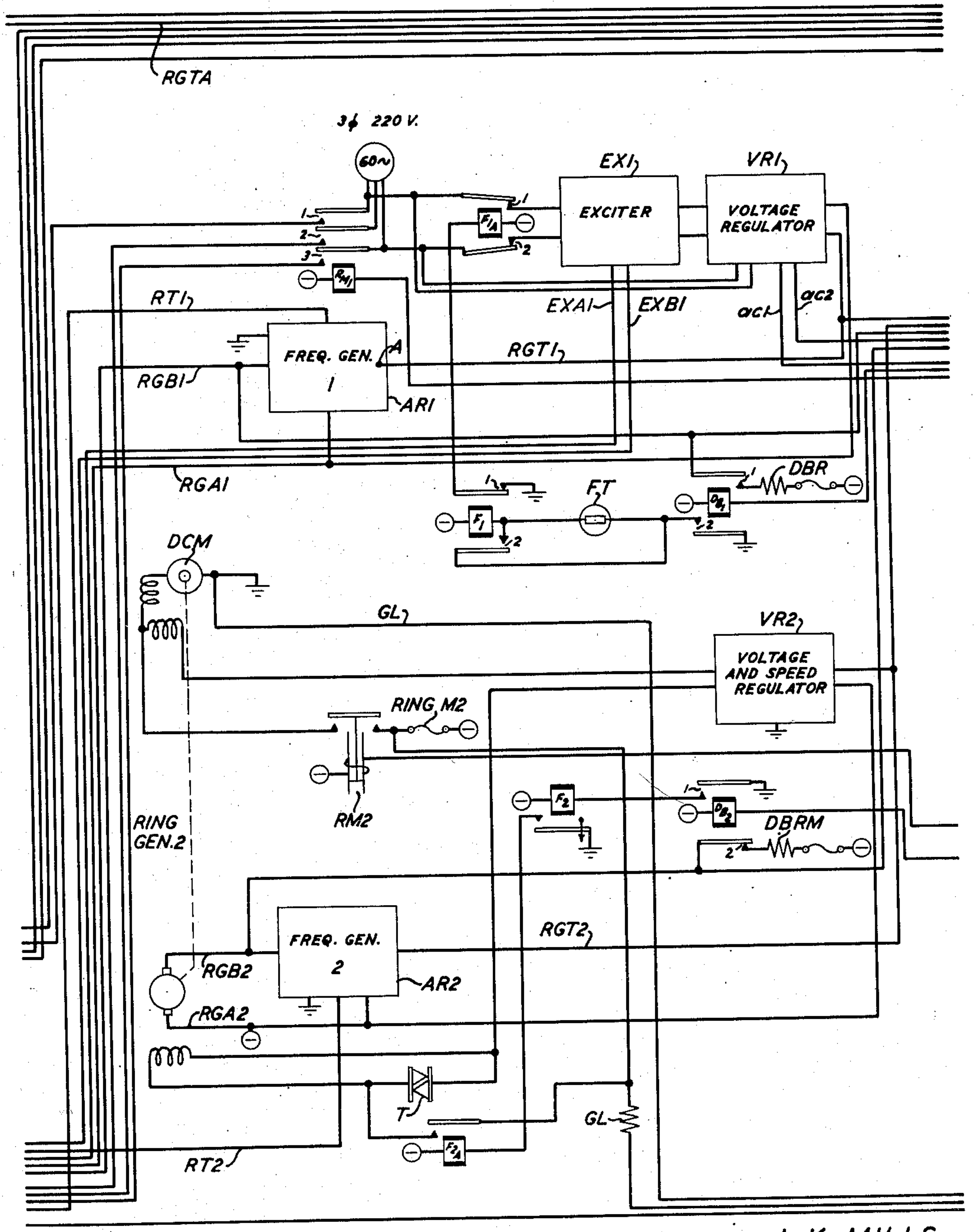
Figure 4:
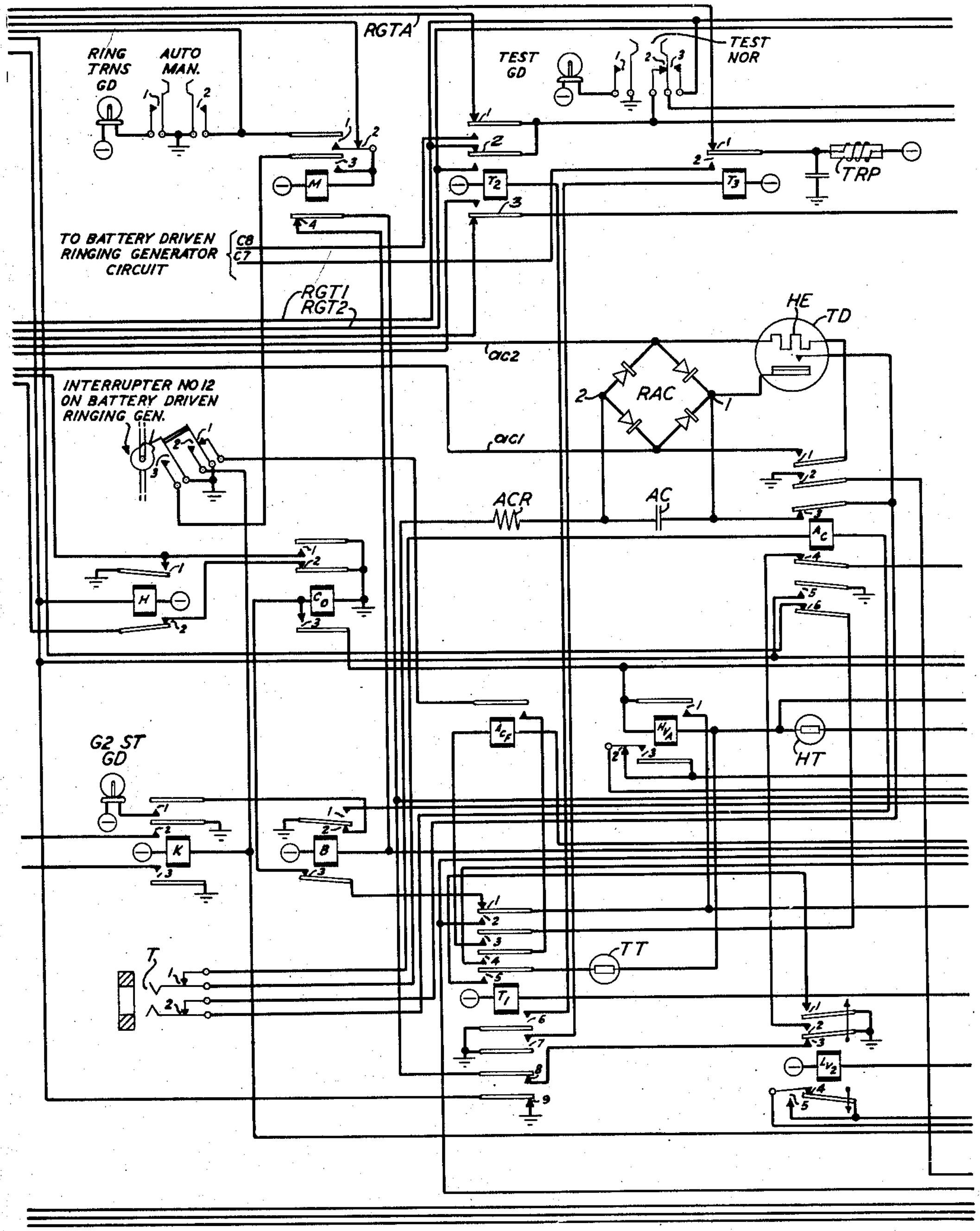
Figure 5:
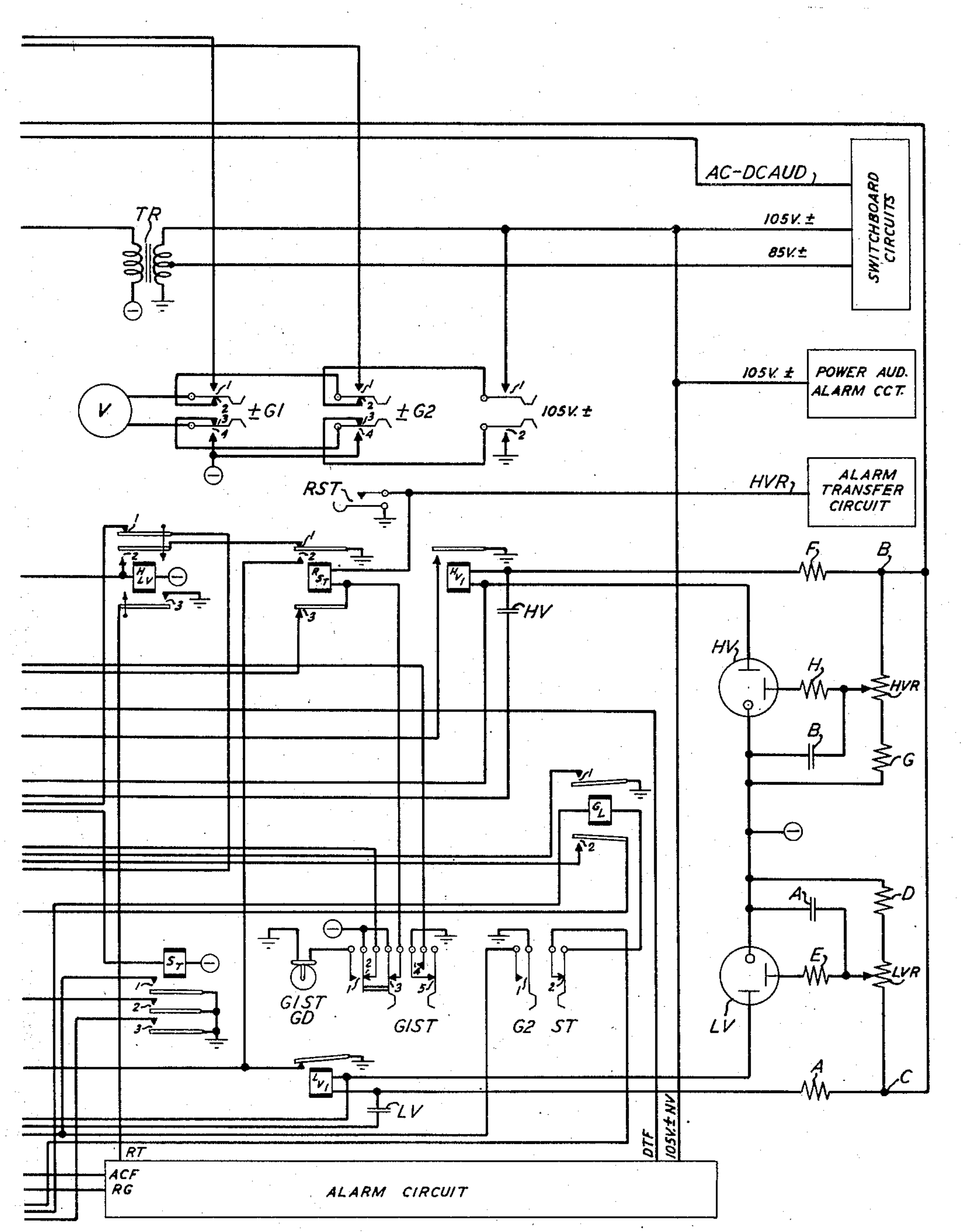

Fig. 3 shows the connections to the battery motor driven ringing generator circuit, the supply circuit for the alternating-current motor, the exciter for its associated ringing generator, the frequency generators, and the voltage regulators for each set;

Fig. 4 and Fig. 5, taken together, disclose the control circuit for the transfer of the alternating-current and battery driven ringing generator sets;

Fig. 6 is a diagram showing the open and closed intervals of the cam-operated interrupter contacts for both ringing generator sets; and Fig. 7 is a diagram showing the manner in which Figs. 1, 2, 3, 4 and 5 should be disposed, each in relation to the other, to form an operative circuit.

GENERAL

Before proceeding with a description of the detailed operation of the circuit, certain of the apparatus which is not shown in detail, but which is well known in the art, will be described.

Certain of the ringing set apparatus associated with the battery driven motor, particularly the interrupters, is not shown in detail, as, except for the motor, it is identical with the power service motor driven set shown in Fig. 1. The battery driven motor and generator are shown at the middle and bottom left, respectively, in Fig. 3 and the connections from its interrupters, not shown, which are identical with the interrupter arrangement in Fig. 1, are shown at the left in Fig. 2.

The motor of the battery driven machine is a direct-current motor having an armature, a series field winding and shunt field winding, as shown in Fig. 3. The armature circuit of the motor extends from ground through the armature and series field windings, through the contacts of relay RM2, when operated, and fuse Ring M2 to battery. The shunt field circuit of the motor extends from ground on the voltage and speed regulator VR2, through the shunt field winding and contacts of relay RM2, when operated, and fuse Ring M2 to battery.

The output of the ringing generator Ring Gen 2 is supplied through the two brushes of the generator to the frequency generator AR2 and thence to the output circuit as is described in detail under later headings. The field winding of Ring Gen 2 extends from ground on the voltage and speed regulator VR2, through the field winding and contacts of relay F2A, when operated, and fuse Ring M2 to battery.

Two tone generators, Tone Gen 1 and Tone Gen 2, Fig. 1, are mounted on the alternating-current driven set and two similar tone generators, not shown, are mounted on the battery driven set. These tone generators produce audible tones of required frequencies which are supplied through the conductors connected to their associated coils, as shown in Fig. 1, in a well-known manner, for various purposes in the communication plant, such as dial tone, as an indication that dialing may be started, trouble tone, etc.

The conductors supplying the various tones are shown extending from the windings associated with the tone generators to break contacts associated with transfer relay T. Conductors supplying corresponding tones extend from the tone generators, not shown, mounted on the battery driven set, to make contacts of transfer relay T. Normally the alternating-current ringing and tones from the alternating-current driven generator are supplied to the load. When the relay T is operated, in a manner to be described, the ringing and tones are supplied from the battery driven set.

The audible ringing tone is produced by modulation in a frequency generator, of which there is one associated with the alternating-current driven set, indicated by the rectangle, designated Freq Gen 1 and another associated with the battery driven set, indicated by a rectangle designated Freq Gen 2. In the case of the frequency generator, associated with the alternating-current driven set, ringing current, of 20 cycles, for instance, is supplied from its ringing generator Ring Gen 1, through conductors RGA1 and RGB1 to the Freq Gen 1. Higher frequency current, 500 cycles, for instance, is furnished from the tone generator Tone Gen 1 over a path from ground through the coil forming part of Tone Gen 1 and through conductor RT1 to the frequency generator Freq Gen 1. The function of the frequency generator is to modulate the 500-cycle frequency by varying its amplitude at a 40-cycle rate and to impress the modulated frequency on the 20-cycle input to produce an audible ringing tone which is supplied over conductor RGT1. There are many well-known circuits for performing this function, among them the vibrator circuit disclosed in Patent 1,532,207, granted to L. J. Stacy, April 7, 1925, and the varistor modulators disclosed in Patents 2,271,073, granted to W. F. Kannenberg, January 27, 1942, and 2,268,837, granted to W. Lutzenberger, January 6, 1942.

The battery driven set is similarly arranged, the low frequency ringing current being supplied from the generator through conductors RGA2 and RGB2 to the frequency generator Freq Gen 2 associated with the battery driven set.

The higher frequency ringing tone is supplied over conductor RT2 from a tone generator on the battery driven set corresponding to Tone Gen 1 on the alternating driven set. The modulated output is supplied through lead RGT2. Conductors RGT1 and RGT2 supply the audible ringing tone to the break and make contacts respectively associated with contact 2 of relay T2, Fig. 4. With the alternating-current driven set in operation, in which condition relay T2 is normal, as shown, the modulated ringing tone path is continuous through contact 2 of relay T2 to parallel branches. One branch extends through the break contact associated with contact 1 of relay T2, conductor RGTA and is multiplied to contacts associated with various interrupters, Fig. 1, of the alternating-current driven set. When the interrupter contacts are closed, ringing current, modulated with the audible tone, is supplied through the break contacts of transfer relay T, Fig. 2, when relay T is normal as shown, to the common load circuit. The second branch of the parallel circuit extends to the switchboard circuits, indicated by a rectangle. Another circuit extends from the second branch through contact 2 of key Test Nor to test the ringing generator high and low voltage transfer tubes HV and LV.

Relay T3, which is normally in the release condition, as shown in Fig. 4, controls the supply of battery which is used to trip or stop the ringing. The circuit extends from battery through the inductance coil TRP and contact 1 of relay T3 to the interrupter contacts and, when the contacts are closed, over a circuit heretofore traced through break contacts of relay T, Fig. 2, to the common load supply circuit.

When the battery set is carrying the load, relays T2 and T3 will be operated, in a manner to be described. With relay T2 operated, ringing current from the battery driven ringing set, modulated with the audible tone from the tone generator associated with the set will be supplied from Freq Gen 2 through lead RGT2 and the make contact associated with armature 2 of relay T2 through the make contact associated with armature 1 of relay T2 to conductor C8 which extends, in a manner corresponding to that described for conductor RGTA, through interrupters on the battery driven set and make contacts of relay T, Fig. 2, when operated, to the common load circuit.

When the battery driven set is carrying the load and relay T2 is operated and its armature 2 is in engagement with its make contact, the 20-cycle ringing supply modulated with the audible tone is connected through armature 2 to the paths traced to the switchboard circuit, and the ringing generator high-voltage transfer circuit and low-voltage transfer circuit. The operation of the high-voltage transfer circuit and the low-voltage transfer circuit will be determined by the voltages produced by the alternating-current driven ringing generator when it is carrying the load and transfer relay T2 is normal, and by the voltages produced by the battery driven ringing generator when it is carrying the load and transfer relay T2 is operated.

When transfer relay T3 is operated, in a manner to be described, the ringing tripping battery is connected through contact 2 of transfer relay T3 to conductor C7 which supplies tripping battery to the interrupters, not shown, of the battery driven set.

The voltage regulator and exciter combination VR1 and EX1 associated with the alternating-current driven set may be any of a number, well known in the art, as disclosed, for instance, in Patents 2,323,857, granted to B. Trevor, July 6, 1943, and 2,008,855, granted to A. E. Drobish, July 23, 1935. In one well-known form the 20-cycle voltage output of Ring Gen 1 is supplied through conductors RGA1 and RGB1 to the input of the voltage regulator VR1 and applied therein to a full-wave bridge type dry rectifier. Bridged across the output of the rectifier in series with a resistor is a cold cathode gas-filled tube which tube serves as a fixed voltage supply, across the anode-cathode of a regulating amplifier bridged also across the rectifier output. The grid of the amplifier is connected to a point on a potentiometer voltage divider also bridged across the rectifier output. The potential of the grid and the amplifier output varies with the variation of the voltage of the 20-cycle ringing alternator. The output of the regulating amplifier in turn controls the output current of parallel triode vacuum tubes. Thus, a current is produced varying with the output voltage of the alternating-current driven ringing set.

The exciter EX1 is supplied with alternating power from the commercial power supply through contacts 1 and 2 of relay F1A which is normally operated while the commercial power is normal. The commercial supply is rectified, for instance, by a full-wave dry rectifier in the exciter EX1, filtered and then supplied through a series circuit which extends through conductors EXA1 and EXB1 and the field winding of the 20-cycle ringing generator to parallel branches in exciter EX1 which branches comprise an adjustable resistor and the anode-cathode circuit of the parallel triodes, mentioned in the foregoing, in the voltage regulator.

Thus, the rectified current drawn from the commercial supply through the field winding of the alternating-current ringing generator is varied, as one of the components in a shunt, that is the anode-cathode circuits of the parallel triodes in the voltage regulator, is varied, in consonance with the variations in the output voltage of the ringing alternator. As the output voltage of the ringing alternator increases, the resistance of the parallel triode shunting elements in the exciter circuit EX1 increase reducing the current through the alternator field reducing the output voltage and vice versa.

The battery driven set is controlled by a voltage and speed regulator VR2, Fig. 3, the function of which is to automatically control the speed of the motor of the battery driven set and the output voltage of the ringing alternator driven by the motor. There are a number of arrangements well known in the art for performing these functions. A suitable speed regulator for the motor is disclosed in Patent 2,001,557, granted to L. H. Von Ohlsen, May 14, 1935. A suitable voltage regulator for the generator is disclosed in Patent 1,998,104, granted to J. H. Sole, April 16, 1935. The motor speed and generator voltage regulators may each be controlled, for instance, from the output of the ringing generator associated with the battery driven set, which output may be applied in the voltage and speed regulator VR2 through circuits therein, not shown, comprising individual rectifiers to control individual solenoids to vary the magnitude of individual resistance elements connected to the respective field windings of the motor and the generator. The conductors connected at the right of the voltage and speed regulator VR2 are from the output of the motor-driven generator. The field circuit of the motor of the battery driven set extends from grounded battery through fuse Ring M2, contacts of relay RM2, through the motor field windings, and into the regulator VR2 and through a first speed responsive solenoid controlled variable resistance element, not shown, in the regulator VR2 to ground. The field circuit of the ringing generator of the battery driven set extends from grounded battery, through fuse Ring M2, contact of relay F2A, and the field winding, of the generator, and through a second voltage responsive solenoid controlled variable resistance element, not shown, in the regulator VR2 to ground.

The two oppositely poled non-linear resistance elements T, Fig. 3, which are preferably a mixture of silicon carbide and carbon or a mixture of silicon carbide and other conducting materials, are intended to absorb transient voltage surges as the circuit of the generator field winding is opened and closed.

ALTERNATING-CURRENT POWER FAILURE TRANSFER

*Automatic transfer*

The battery driven ringing generator set is a reserve or emergency set as is well understood. Power to drive the battery driven set is supplied from the central office battery through fuse Ring M2, Fig. 3, and it is desirable to conserve the central office battery so that the battery driven set is used only when the alternating-current power service has failed or while the alternating-current driven ringing set is delivering abnormal voltage or is being tested or operated for service or maintenance or is otherwise out of service. The alternating-current commercial power driven set will, therefore, ordinarily be in service and carrying the load.

When the alternating-current driven set is normally carrying the load, relays LV1, LV2, B, H, GL, AC and RM1 are operated in a manner to be described. A three-phase, 220-volt, 60-cycle current, for instance, is furnished from the commercial source, top of Fig. 3, through contacts 1, 2 and 3 of relay RM1, to the alternating-current motor ACM in Fig. 1, operating the motor which is coupled through a shaft to the two tone generators, Tone Gen 1 and Tone Gen 2, the ringing generator Ring Gen 1 and the Gear Box which comprises a gear train which affords suitable speed rotation reduction for driving the Cam Shaft on which are integrally mounted cams 1 to 18. The Cam Shaft rotates once in six seconds and opens and closes the contacts associated with the individual cams as indicated in Fig. 6. The battery driven motor generator, tone, gear and cam, and contact equipment is not shown in detail. Except for the fact that the motor is battery driven, and in the contacts associated with interrupter cam No. 12 it is to be understood that it is otherwise identical with the alternating-current motor driven set.

The open and closed circuit intervals produced on the various cams and the tones produced by the tone alternators of the alternating-current driven set are supplied through the break contacts of relay T in Fig. 2 to the common output leads which extend them to the various circuits as needed in the communication plant. The conductors connected to the make contacts of relay T in Fig. 2, designated to Second Interrupter Circuit and to Battery Driven Ringing Generator, it is to be understood, extend to cam contacts and tone generator terminals of the battery driven set corresponding to those to which the break contact with which each make contact is associated on relay T extends in the alternating-current driven set.

The alternating-current from the power supply is also impressed through contacts 1 and 2 of relay F1A on the Exciter which supplies current through the two conductors EXA1 and EXB1 extending from the bottom margin of the rectangle labeled Exciter in Fig. 3 to the field windings of the ringing generator Ring Gen 1 in Fig. 1.

The output of the ringing generator Ring Gen 1 is supplied through the two brushes of the generator and the two conductors connected thereto to the frequency generator AR1 in Fig. 3. From terminal A of the frequency generator the circuit extends through armature 2 of relay T2 in Fig. 4, contact 2 of Test Nor key in Fig. 4 to terminals B and C in Fig. 5. From terminal C the circuit extends through resistor A and the winding of relay LV1 to the main anode of low voltage cold cathode gas-filled tube LV. From terminal C a circuit may be traced through potentiometer-resistor LVR and resistor D to negative battery. The control anode of tube LV is connected through resistor E to an adjustable contact on resistor LVR. The cathode of tube LV is connected to the junction of negative battery and resistor D. The high-voltage tube HV is similarly arranged. From terminal B a circuit branch may be traced through potentiometer-resistor HVR and resistor G to negative battery and to the cathode of tube HV. The control anode of tube HV is connected through resistor H to the adjustable arm of the potentiometer HVR. The main anode of the tube HV is connected through the winding of relay HV1 and resistor F to terminal B. The adjustable arm of potentiometer LVR is set in such position that the tube LV will normally be activated and will be extinguished at some predetermined voltage somewhat less than the minimum permissible operating voltage of the system. The adjustable arm of potentiometer HVR is adjusted so that tube HV will be activated at some predetermined voltage somewhat greater than the maximum permissible operating voltage of the system.

When either generator is connected to the common load circuit and is delivering an output voltage above the permissible minimum to tube LV, tube LV will be activated and relay LV1 will be in the operated condition, as shown. With relay LV1 in the operated condition, as shown, a circuit is established from ground through the contact of relay LV1 and the winding of relay LV2, in Fig. 4, to battery operating relay LV2. With relay LV2 operated a circuit may be traced from ground through contact 3 of relay LV2, contact 8 of relay T1, contact 4 of relay M and the winding of relay B to battery operating relay B. Relay H is in the operated condition since relay T1 is released and a circuit is established from ground through contact 9 of relay T1 and the winding of relay H to battery. Relay GL is operated over a circuit which extends from ground connected to motor DCM, Fig. 3, through lead GL, contact 2 of key G2 ST, Fig. 5, winding of relay GL, resistor GL, Fig. 3, and fuse Ring M2 to battery.

When the alternating-current from the commercial service is being supplied, alternating current will be furnished through conductors AC1 and AC2, shown extending from the bottom margin of the voltage regulator VR1, Fig. 3, to the vertical diagonals of the full-wave dry rectifier bridge RAC. Direct current is furnished from the horizontal diagonals 1, 2 of the bridge. Relay AC releases on failure of direct current supplied from terminals 1, 2 of the bridge in response to failure of the alternating-current commercial supply. The circuit will be traced hereinafter. With relay AC released and its terminal 1 closed, upon the restoration of the alternating-current commercial service, alternating-current will be furnished through the heating element HE of time delay thermal relay TD and terminal 1 of relay AC which are connected in series across the vertical diagonals of the bridge RAC. After an interval of 30 to 45 seconds the contact of relay TD will close. This will establish a direct-current path extending from terminal 1 of the bridge RAC through the contact of relay TD, contact 2 of jack T, winding of relay AC, contact 1 of jack T and resistor ACR to terminal 2 of the bridge RAC, operating relay AC. When relay AC operates, upon the closure of contact 3, a circuit may be traced from terminal 1 of the bridge RAC through contact 3 of relay AC, contact 2 of jack T, winding of relay AC, contact 1 of jack T and resistor ACR to terminal 2 of bridge RAC, locking relay AC in the operated position, opening its contact 1, disconnecting power from the heating element HE of relay TD and permitting its contact to open. Relay AC will, therefore, normally be operated while alternating-current commercial power is being furnished to the system after a delay interval to permit tubes in the voltage regulator VR1 to warm up. When the alternating-current service fails and relay AC releases, a circuit is established from ground through contact 2 of relay AC, and the alternating-current failure lead ACF in the alarm circuit, Fig. 5, to operate an alarm therein indicating the condition. The release of relay AC by opening its contact 4 opens the path which extends from battery through the winding of relay HLV, contact 4 of relay AC and contact 2 of relay LV2 to ground, so that when relay LV2 subsequently releases relay HLV cannot be operated. The failure of the commercial alternating-current supply will cause the alternating-current motor ACM in Fig. 1 to slow down and ultimately stop, and when the output voltage of the ringing generator Ring Gen 1 falls sufficiently, tube LV in Fig. 5 will be inactivated releasing relay LV1. The rerelease of relay LV1 in turn releases relay LV2.

While relays LV1 and LV2 were operated, relay B was operated over a path heretofore traced through contact 3 of relay LV2. Relay B controls the transfer of the common load circuit from the alternating-current motor driven set to the battery motor driven set and, as has been explained, relay B is normally operated while the alternating-current driven set is in service. Now that transfer is to be effected to the battery driven set, relay B is released. The release of relay B by opening its contact 2 prevents the lighting of lamp G2 ST GD, which is connected to open contact 1 of relay K, since relay K is about to be operated in a manner to be described. The release of relay B establishes a circuit from ground through contact 1 of relay B and the winding of relay ST to battery operating relay ST. The operation of relay ST establishes a circuit from ground through contact 2 of relay ST and the winding of relay T1 to battery operating relay T1. The operation of relay T1 establishes a circuit from ground through contact 6 of relay T1 and the winding of relay T2 to battery operating relay T2. The operation of relay T1 also establishes a circuit from ground through contact 7 of relay T1 and the winding of relay T3 to battery operating relay T3 to transfer the battery for tripping ringing to the interrupters of the battery driven set. The operation of relay ST also establishes a circuit from ground through contact 3 of relay ST and the winding of transfer relay T to battery in Fig. 2, operating relay T, which transfers the common load circuit from the output of the alternating-current driven machine to the output of the battery driven machine. The operation of relay ST also establishes a circuit from ground through contact 1 of relay ST and the winding of relay K to battery operating relay K. The operation of relay K establishes a circuit from ground through contact 3 of relay K and the winding of relay DB2 to battery operating relay DB2. The operation of relay DB2 by opening its contact 2 disconnects dynamic braking resistor DBRM from the output of the battery driven machine. The output circuit of the battery motor driven generator extends from negative battery through the armature of the battery motor driven generator and back to Freq Gen 2. The dynamic braking resistor is shunted directly across this output from negative battery through resistor DBRM. Resistor DBRM is shunted directly across the output of the battery driven machine when the machine is to be stopped without delay and operates to limit further rotation of the machine in a well-known manner. Now that the battery driven machine is to be put into service the dynamic braking resistor DBRM is disconnected from across its output. The operation of relay K establishes a circuit from ground through its contact 2 and the winding of relay RM2 operating relay RM2 which supplies battery through fuse Ring M2 to start the battery set in operation. The operation of relay DB2 establishes a circuit from ground through its contact 1 and the winding of relay F2 to battery operating relay F2. The operation of relay F2 in turn establishes a circuit from ground through the contact of relay F2 and the winding of relay F2A to battery operating relay F2A. The operation of relay F2A establishes a circuit from battery through the contact of relay F2A to connect power to the field of the generator of the battery driven set. The path has heretofore been traced. The release of relay LV2 also establishes a circuit from ground through contact 1 of relay LV2, contact 5 of relay T1, thermistor TT, winding of relay HVA, contact 3 of relay RST and contact 3 of key G1 ST to battery. However, the thermistor TT introduces a delay which prevents operation of relay HVA during the transfer period until relays LV1 and LV2 reoperate from the direct-current set.

Automatic Restoral to Line Set After Alternating-Current Power Returns

When the alternating-current motor driven ringing generator set stops due to power failure, its stopping point is at random as the dynamic brake applied by connecting dynamic braking resistor DBR in shunt with the ringing generator output conductors RGA1 and RGB1, which later connects to negative battery as does braking resistor DBR, is nullified, due to the loss of the generator field supply from the alternating-current operated exciter EX1, Fig. 3. Assume that the set stopped near the start of the ringing cycle. When power is restored the line or alternating-current driven set starts running again. It has been explained that relay H in Fig. 4 was held operated from ground through contact 9 of relay T1. This ground was lost when relay T1 operated. However, before the loss of this ground relay H received a holding ground due to the release of relay AC, which supplies ground through its contact 5 to the winding of relay H. Time delay relay TD which is released at this time prevents relay AC from operating until about 30 to 45 seconds after the alternating-current service has been restored. The reason for this is to allow time for the vacuum tubes in the voltage regulator VR1, Fig. 3, associated with the alternating-current supply to warm up. After this delay, relay TD operates, in turn operating relay AC as heretofore described. When relay AC operates it locks up from the rectifier RAC through its contact 3 and by opening its contact 1 opens the circuit through the heater element HE of time delay relay TD as heretofore described. The operation of relay AC, by opening its contact 2, removes ground from the alternating-current failure lead ACF to the alarm circuit. The operation of relay AC, by closing its contact 4, extends a path which may be traced from battery through the winding of relay HLV and contact 4 of relay AC to contact 2 of relay LV2 which is open at this time, since relay LV2 was reoperated when the battery set was connected to the load. The operation of relay AC, by opening its contact 5, removes ground from the winding of relay H. However, relay H now receives holding ground over a path through contact 2 of cam 12 associated with the alternating-current set, since cam 12 is not in its end of cycle position. This ground through contact 2 associated with cam 12 will be supplied until the end of the code cycle when cam 12 will return to the stop or end-of-cycle position. Cam 12 and its associated contacts will be called hereinafter the Motor Stop interrupter. There is one on each ringing set. At the end of the code cycle, ground is removed from contact 2 of cam 12 of the alternating-current set and relay H releases. The release of relay H, by opening its contact 2, releases relay RM1 in Fig. 3 which removes power from the alternating-current motor. The release of relay H also establishes a circuit from ground through contact 1 of relay H and the winding of relay DB1 in Fig. 3 to battery operating relay DB1. The operation of relay DB1 connects battery through dynamic braking resistor DBR and contact 1 of relay DB1 across the output of the ringing generator. Dynamic braking resistor DBR is of sufficiently low resistance that it effectively short-circuits the output of the ringing generator applying a dynamic brake thereto. The operation of relay DB1 establishes a circuit from ground through its contact 2, thermistor FT and the winding of relay F1 to battery operating relay F1. The operation of relay F1 by opening its contact 1 disconnects ground from the path through the winding of relay F1A releasing relay F1A. The release of relay F1A removes the alternating-current supply from the exciter EX1 and so removes the generator field current to prevent overheating when the alternating-current set is not running. The thermistor FT, previously mentioned, delays the operation of relay F1 so as to maintain the generator field excitation until after the set has been dynamically braked. When the Motor Stop interrupter of the alternating-current set removes ground from its contact 2, it simultaneously supplies ground through its contact 1, contact 6 of relay AC, contact 2 of relay T1, winding of relay ACF and contact 2 of key G1 ST to battery, operating relay ACF. It is to be understood that during this interval the battery driven set is operating. When it comes to the end of its cycle the Motor Stop interrupter associated with the battery driven set will close its contact 1. The Motor Stop interrupter No. 12 on the battery driven ringing generator set is shown at the left middle portion of Fig. 4. When its contact 1 is closed, a circuit may be traced from ground through contact 1, the contact of relay ACF, contact 4 of relay T1, contact 1 of relay HLV, contact 4 of relay M and the winding of relay B to battery operating relay B.

The operation of relay B, by opening its contact 1, releases relay ST. The release of relay ST in turn releases transfer relay T in Fig. 2, relay K in Fig. 4 and relay T1 in Fig. 4. The release of relay T also releases relays T2 and T3. All transfer relays being released, the load is now retransferred from the battery driven set to the alternating-current driven set.

The release of relay T1 again connects ground through its contact 9 to reoperate relay H. Relay H operated in turn operates relay RM1 to start the alternating-current set and releases relay DB1 to remove the dynamic brake. Relay DB1 in turn releases relay F1. The release of relay F1 operates relay F1A to reconnect the alternating-current supply to the exciter EX1, which in turn supplies current to the field winding of the alternating-current motor driven ringing generator. The release of relay K in turn releases relay RM2 to remove battery from the motor of the motor driven set. The release of relay DB2 connects battery through the resistor DBRM, the dynamic braking resistor for the battery motor driven set, and contact 2 of relay DB2 which shorts the output of the ringing generator associated with the battery driven set. The resistor DBRM is also of sufficiently low value to perform the dynamic braking function for the battery motor driven set.

The release of relay DB2, by opening its contact 1, releases relay F2 which is a slow-to-release relay. The release of relay F2 in turn releases relay F2A to remove the field from the generator of the battery driven set after it has stopped.

If, after failure of the alternating-current supply, the fuse Ring M2 which supplies battery to the motor of the battery driven set, should blow out, the office would be without ringing current and the other services supplied from the ringing sets. The battery driven set would stop and probably in such position that contact 1 of its Motor Stop interrupter would be open. As a result of this relay B would not be reoperated through the Motor Stop interrupter contact 1, as described in the foregoing. However, in such a contingency, relay GL in Fig. 5 would be released. As has been described hereinbefore, relay GL is normally maintained in the operated condition over a path heretofore traced from battery through the fuse Ring M2. Now, with the fuse assumed blown, relay GL releases. This establishes a circuit from ground through contact 1 of relay GL and the winding of relay B to battery holding relay B in the operated condition. With relay B in the operated condition, the load is maintained on the alternating-current driven set. When the alternating-current power is restored, the alternating-current driven set will start and pick-up the load. This feature prevents a complete shutdown of the ringing plant if the alternating-current power is restored before it is possible to replace the blown fuse Ring M2. This situation might arise in an unattended office during a short power failure. When transfer relay T1 was released, as a result of the release of relay ST, ground was supplied through contact 8 of relay T1 to operate relay H. Relay H when operated in turn operates relay RM1, to start the alternating-current driven set, and also releases relay DB1 to remove the dynamic braking short circuit. Relay DB1 when released releases relay F1 which in turn operates relay F1A to connect alternating-current power to the exciter EX1 associated with the generator field of the alternating-current driven set.

Low Voltage Transfer

*Automatic transfer to battery set*

The present circuit will effect an automatic transfer from the alternating-current driven set to the battery driven set in the event that the voltage supply from the alternating-current driven ringing generator falls below a predetermined minimum. In this case it is assumed that the alternating-current service supply to the alternating-current driven motor is normal. If the ringing voltage falls, due to trouble in the voltage regulator or from other causes, discharge through the low voltage tube LV will cease in turn releasing relay LV1. The release of relay LV1 disconnects ground from the winding of relay LV2 which also releases. Since it is assumed that the alternating-current service is normal, relay AC on this occasion will be operated. The release of relay LV2, therefore, establishes a circuit from ground through contact 2 of relay LV2, contact 4 of relay AC and the winding of relay HLV to battery, operating relay HLV. Relay HLV operated locks from battery through its winding and its contact 2 and contact 1 of relay RST to ground. The operation of relay HLV establishes a circuit from ground through its contact 3 which extends into the alarm circuit through conductor RT, which brings in a Ring Transfer alarm. The operation of relay HLV, by opening its contact 1, opens the path which extends from contact 1 of the Motor Stop interrupter No. 12 on the battery driven ringing generator set, which prevents the reoperation of relay B when the battery driven set reaches the end of its cycle. The release of relay LV2, by opening its contact 3, opens a path which has been traced through the winding of relay B, releasing relay B and the transfer takes place as described under the heading for the Alternating-Current Power Failure Transfer—Automatic Transfer. At the end of the code cycle of the alternating-current driven set, ground from its Motor Stop interrupter is removed due to the opening of contact 2, releasing relay H. Simultaneously ground is connected through contact 1 of this interrupter operating relay ACF over a circuit heretofore traced. The release of relay H releases relay RM1 to stop the line set and operates relay DB1 to apply dynamic braking. Relay DB1 operated, operates relay F1, which then releases relay F1A. The release of relay F1A removes alternating-current power from the exciter EX1. Thus, the alternating-current set is placed in the stopped condition in its end-of-code cycle position. Relay ACF operated closes a path from ground through contact 1 of the Motor Stop interrupter on the battery driven ringing generator, contact of relay ACF and contact 4 of relay T1 to the open contact 1 of relay HLV. This prepares a path for restoral to the alternating-current driven set to be described hereinafter. If the battery set also develops low voltage, the second release of relay LV2 will establish a circuit from ground through contact 1 of relay LV2, contact 5 of relay T1, thermistor TT, winding of relay of HVA, contact 3 of relay RST and contact 3 of key G1 ST to battery, operating relay HVA after a short delay introduced by thermistor TT. The operation of relay HVA will establish a circuit from battery through contact 3 of key G1 ST, contact 3 of relay RST, contact 1 of relay HVA and contact 2 of relay T1 which extends into the alarm circuit over conductor RG to operate the ringing failure alarm.

Restoring to Alternating-Current Driven Set

Before the alternating-current driven set is reconnected to the common load circuit, it is necessary to insure that the trouble has been cleared and that the voltages delivered by its associated ringing generator are within operating limits. The alternating-current driven set may be run by operating the G1 ST key as described hereinafter. If the voltages are satisfactory key RST, middle of Fig. 5, is operated. This establishes a circuit from ground on the contacts of the key through the winding of relay RST and contact 3 of key G1 ST to battery, operating relay RST. Relay RST, by opening its contact 1, unlocks relay HLV, which releases. With relay HLV released, the next time the battery driven set reaches its end-of-cycle position, ground is connected through contact 1 of its Motor Stop interrupter, through the contact of relay ACF, contact 4 of relay T1, contact 1 of relay HLV, contact 4 of relay M and the winding of relay B to battery, operating relay B. It is pointed out that relay ACF is held operated at this time, since the stopping of the alternating-current driven set supplies ground through contact 1 of its Motor Stop interrupter, contact 6 of relay AC, contact 3 of relay T1, winding of relay ACF and contact 2 of key G1 ST to battery, holding relay ACF operated. Relay B operated shuts down the battery driven set and transfers the load to the alternating-current driven set as described heretofore. Release of relay T1 releases relay ACF. Relay ACF is operated only when the battery driven set is connected to the load and the alternating-current driven set is at the end of cycle position, to insure that transfer to the alternating-current driven set will take place only when both sets are in their end of cycle position.

The present circuit is arranged so that if it is installed in an unattended or partially attended office, the alarms brought in by failure of the present circuit will appear or be heard at another office, where alarms from a number of offices may be centralized. Under such circumstances a control in the Alarm Transfer Circuit, indicated by a rectangle at the right in Fig. 5, at the distant office, will be actuated to impress ground on conductor HVR and the circuit is extended through the winding of relay RST and contact 3 of key G1 ST to battery operating relay RST. If the trouble were of short duration and the normal power service condition had already been restored, the transfer back to the alternating-current driven set would take place in the usual way, otherwise a transfer back to the battery set would occur when relay RST is released through the removal of ground from the conductor HVR, and the alarm will reappear.

High Voltage or Dial Tone Transfer

*Automatic transfer to battery set*

The manner in which the circuit functions to effect an automatic transfer from the alternating-current driven set to the battery driven set, in response to the development of a voltage above a predetermined maximum, will now be described.

In response to the high voltage, tube HV will be activated and relay HV1 will be operated. The operation of relay HV1 establishes a circuit from ground through the contact of relay HV1, thermistor HT, winding of relay HVA, contact 3 of relay RST and contact 2 of key G1 ST to battery operating relay HVA. The operation of relay HVA establishes a circuit from the ground through the winding of relay CO, contact 3 of relay B, contact 1 of relay T1, contact 1 of relay HVA, contact 3 of relay RST and contact 3 of key G1 ST to battery operating relay CO.

The operation of relay CO, by opening its contact 2, releases relay RM1 which removes power from the motor of the alternating-current driven set. The operation of relay CO by closing its contact 1 operates relay DB1 to dynamically brake the alternating-current driven set. When operated, relay CO is locked over a path from ground through its winding and contact 3, contact 3 of relay RST and contact 3 of key G1 ST to battery. The transfer to the battery set takes place as described under the heading Low Voltage Transfer-Automatic Transfer to Battery Set, due to the release of relay LV1 and brings in a Ring Transfer alarm. It should be understood, from the foregoing, that relay LV1 is released because power has been removed from the alternating-current set and its output voltage drops to zero deactivating tube LV1.

In case of dial tone failure, ground is connected in the alarm circuit to the dial tone failure lead DTF and a circuit is established through delay thermistor HT, winding of relay HVA, contact 3 of relay RST and contact 3 of key G1 ST to battery operating relay HVA and the transfer takes place as described for high-voltage transfer.

Restoring to Alternating-Current Driven Set

Before restoring the alternating-current driven set to the common output circuit, a check is made to insure that the trouble has been cleared and the output voltages are within the permissible operating limits. The alternating-current driven set may be operated for checking the voltages by operating the G1 ST key as described hereinafter.

After the voltages have been checked by operating the alternating-current driven set, key G1 ST is restored to normal. This, as shall be made clear hereinafter, stops the alternating-current driven set at its end-of-cycle position. The battery driven set, it should be understood, is in operation and carrying the load. It is assumed that it is now desired to remove the battery driven set from service and transfer the load to the alternating-current driven set. This transfer must be performed at the end-of-cycle position of each set so as not to mutilate any of the code services.

To do this, first key RST is operated momentarily. This operates relay RST which opens the locking path of relay HLV which releases. At the end of the ringing cycle of the battery driven set its Motor Stop interrupter, Fig. 4, connects ground through its contact 1 and through the contacts of relays ACF, T1, HLV and M to operate relay B as described under the heading Restoring to Alternating-Current Driven Set. The operation of relay B shuts down the battery driven set and transfers the load to the alternating-current driven set as described under the heading Automatic Restoral to Alternating-Current Driven Set After Alternating-Current Power Returns.

Manual Transfer

*Manual transfer from alternating-current driven set to battery driven set*

The present circuit is arranged so that it may be transferred also manually from the condition under which the alternating-current driven set is carrying the load to the condition under which the battery driven set is carrying the load. In order to do this the circuit is equipped with a key which in the normal position permits automatic transfer and in the operated position effects transfer manually. The key, shown at the upper left in Fig. 4, is designated Auto Man. To effect manual transfer from the alternating-current driven set to the battery driven set the key Auto Man is operated to its alternate position. This establishes a circuit from ground through contact 1 of key Auto Man and the filament of the ringing transfer guard lamp Ring TRNS GD to battery, lighting the lamp as an indication that the transfer to the battery driven set has been effected manually and the automatic transfer circuit has been disabled. The operation of key Auto Man also establishes a circuit from ground through contact 2 of the key to contact 3 of the Motor Stop interrupter of the alternating-current driven set. It is to be understood that the alternating-current driven set is presently in operation. When cam 12 thereof reaches its end-of-cycle position, its contact 3 is closed and the circuit is extended through make-before-break contact 2 and the winding of relay M to battery, operating relay M. When relay M operates it locks over a path from battery through the winding and contact 1 of relay M and contact 2 of operated key Auto Man to ground. The operation of relay M by opening its contact 4 opens the holding path of relay B which releases. The release of relay B operates relay ST and the other transfer relays and the transfer is effected as described under Low Voltage Transfer-Automatic Transfer to Battery Set.

When relay T1 operates, in effecting manual transfer, it removes holding ground supply through its contact 9 to relay H, but ground was still supplied through contact 2 of the Motor Stop interrupter of the alternating-current driven set, unless the alternating-current driven set was in its end-of-code cycle position. In this instance, the Motor Stop interrupter of the alternating-current driven set is at the end of its code cycle and relay H releases, in turn releasing relay RM1, to shut down the alternating-current driven set. The release of relay H also operates relay DB1 to apply dynamic braking to the alternating-current driven set as described heretofore. Ground from the Motor Stop interrupter of the battery driven set will be applied at the end of each code cycle through its contact 1, contact of relay ACF, which has been operated by the Motor Stop interrupter of the alternating-current driven set at its end-of-code position, contact 4 of relay T1, contact 1 of relay HLV to contact 4 of relay M which is open since relay M is operated. As a result of this relay B is not operated.

Manual Transfer From Battery Set to Alternating-Current Driven Set

After a manual transfer to the battery driven set as just described, the load may be restored to the alternating-current driven set by operating key Auto Man to its original position which is the automatic transfer position. The opening of contact 2 of the key releases relay M, however, unless the Motor Stop interrupter of the battery driven set is in its end-of-code position, ground will be supplied through contact 3 of this interrupter, contact 3 of relay M and the winding of relay M to battery to hold relay M operated. When the end-of-cycle position is reached, ground through contact 3 of the battery driven Motor Stop interrupter is disconnected and relay M releases. The release of relay M extends the circuit which was traced formerly to the open contact 4 of relay M which contact is now closed and through the winding of relay B to battery operating relay B. Relay B operated releases relay ST to shut down the battery set, start the alternating-current driven set and transfer the load to it, as described under the heading, Automatic Restoral to Line Set After Alternating-Current Power Returns.

After a manual transfer to the battery driven set if it is found that the voltage of the battery driven set is low, restoring key Auto Man to its normal position will not restore the circuit to normal as, due to the low-voltage condition, relays LV1 and LV2 will be released and relay HLV will be operated and locked to relay RST as heretofore described. In this case, to restore the load to the alternating-current driven set it is necessary to hold key RST operated until the end of the code cycle of the battery driven set, at which time the transfer to the alternating-current driven set will be effected. With key RST and relay RST held operated, a temporary ground is supplied through contact 2 of relay RST and the winding of LV2 to battery operating relay LV2. Key RST is maintained operated to maintain relay LV2 operated until the end of the cycle, so that transfer will take place. Normally relay LV2 is held operated by the battery driven set, since the voltage delivered from it is not low, and it is not necessary to operate key RST.

Running Alternating-Current Driven Set for Maintenance

*Transfer of load*

In order to operate the alternating-current driven set the load is first transferred to the battery driven set as described under the heading Manual Transfer—Manual Transfer From Alternating-Current Driven Set to Battery Driven Set by operating key Auto Man to its closed contact position which is the manual operation position. Under this condition the alternating-current driven set will be shut down and power will be disconnected from its interrupter springs. The alternating-current driven set may be rotated manually by means of a crank so as to adjust any cam contact and so forth as may be required. In performing this operation the fuses, not shown, in the alternating-current power supply are removed to prevent the operation of the machine through one cycle when the Motor Stop interrupter is in any position other than its end-of-cycle position.

To Keep the Alternating-Current Driven Set Running

If it is desired to keep the alternating-current driven set running after the load has been transferred to the battery driven set by operation of key Auto Man, key G1 ST is operated to its alternate position. This lights lamp G1 ST GD through contact 1 of the key as an indication that the alternating-current driven set is not carrying the load but is being operated by manual controls for maintenance purposes. The opening of contact 2 of key G1 ST removes battery from the winding of relay ACF to prevent the operation of relay ACF by the Motor Stop interrupter of the alternating-current driven set. The reason for this is to prevent shutting down of the battery driven set when its Motor Stop interrupter reaches its end-of-cycle position as relay ACF is operated, as has been shown, when the alternating-current driven set reaches its end-of-code position, then, when the battery driven set reaches a corresponding position, a path is closed through contact 1 of the Motor Stop interrupter and the contact of relay ACF which has been traced through the winding of relay B which would operate relay B and shut down the battery driven set. The operation of key G1 ST also supplies ground through its contact 4 to the winding of relay H operating relay H and starting the alternating-current driven set. The operation of key G1 ST by opening its contact 3 opens the locking path of relay CO releasing it, so that the alternating-current driven set can be run for maintenance purposes after a high-voltage transfer which leaves relay CO locked up through relay RST.

Restoring Alternating-Current Driven Set to Normal

In order to restore the alternating-current driven set to normal, key G1 ST is restored to its normal position, as shown in Fig. 5. At the end of the code cycle of the alternating-current driven set its Motor Stop interrupter will disconnect ground from its contact 2 to release relay H. This, as has been shown, stops the alternating-current driven set and also operates relay ACF to close the path through from contact 1 of the Motor Stop interrupter of the battery driven set, when its cam 12 reaches its end-of-code cycle position. The closing of the path through the contact of relay ACF extends the path from the ground on interruper 12 of the battery driven set through its contact 1 to contact 4 of relay M. When the alternating-current driven set has stopped, key Auto Man is restored to its normal position, as shown in Fig. 4. This, as has been shown, releases relay M and operates relay B to transfer the load back to the alternating-current driven set as described under the heading Manual Transfer—Manual Transfer From Battery Driven Set to Alternating-Current Driven Set. If key Auto Man were restored to normal before key G1 ST, at the end of the code cycle of the battery driven set relay M would release but the path to reoperate relay B would still be open at the contacts of relay ACF. Under these circumstances if key G1 ST is then restored to normal, as shown in Fig. 5, relay ACF will operate at the end of the code cycle of the alternating-current driven set and connect ground through to reoperate relay B, thus transferring the load back to the alternating-current driven set. Attention is called to the fact that it is desirable when a transfer has been effected from the alternating-current driven set to the motor driven set because of low or high voltage or dial tone difficulty, that the alternating-current driven set should be started by operating key G1 ST and its output voltage and dial tone checked before throwing the load on to the alternating-current driven set.

Running Battery Driven Set for Maintenance

*Starting of battery driven set*

The present circuit is arranged so that the battery driven set may be operated for maintenance purposes. In order to do this, key G2 ST is operated to its alternate position closing its contact 1 and opening its contact 2. The opening of its contact 2 releases relay GL. This connects ground through contact 1 of relay GL and the winding of relay B to battery operating relay B and holding it operated to prevent an automatic transfer to the battery driven set. The release of relay GL establishes a circuit from open contact 1 and relay HVA through contact 2 of relay GL which extends through conductor RG into the alarm circuit. The purpose of this is to bring in an alarm in the event of high-voltage failure of the alternating-current driven set which will operate relay HVA closing its contact 1 through contact 3 of relay RST and contact 3 of key G1 ST to battery. This will be made clear hereinafter. The operation of key G2 ST also establishes a circuit from ground through contact 1 of the key and the winding of relay K to battery operating relay K. The operation of relay K, as has been shown, starts the battery set. Since relay B is in the operated position, a circuit may be traced from ground through contact 2 of relay B, contact 1 of relay K and the filament of lamp G2 ST GD to battery, lighting the lamp as an indication that the battery set is being operated for maintenance purposes. As relay B is locked up relay ST is not operated and the load remains on the alternating-current driven set.

Alarms Due to Trouble on the Alternating-Current Driven Set With Key G2 ST Operated to Run the Battery Driven Set There are three conditions which must be cared for when the battery driven set is being operated for maintenance purposes and trouble conditions arise. These are:

1. Alternating-current power service failure.
2. Low voltage delivered from the alternating-current driven set.
3. High voltage from the alternating-current driven set.

In the case of alternating-current power service failure the line set will stop as its motor has no power and the office will have no ringing current. When the power service fails, as has been shown, relay AC will release. The release of relay AC connects ground through its contact 2 to the alternating-current failure conductor ACF, extending into the alarm circuit, which brings in the alternating-current failure transfer alarm. Simultaneously a no-voltage alarm relay in the alarm circuit will bring a major alarm. In response to this, immediate steps are taken to restore the battery driven set to service. When the battery set is ready for service, key G2 ST is restored to its normal position, as shown in Fig. 5, to transfer the load to the battery driven set. This will be made more clear hereinafter.

In the case of low-voltage supply from the alternating-current driven set, relays LV1 and LV2 will release as heretofore described. Relay LV2 released will not release relay B as the latter is held operated due to the release of relay GL in response to the opening of contact 2 of key G2 ST as described in the foregoing, therefore, no transfer to the battery driven set can take place. However, the release of relay LV2 connects ground through its contact 2, contact 4 of relay AC, which is operated, and the winding of relay HLV to battery operating relay HLV. Relay HLV operated, locks up from battery through its winding and contact 2 and contact 1 of relay RST to ground. Relay HLV operated connects ground through its contact 3 and conductor RT which extends into the alarm circuit to bring in a ringing transfer alarm therein. The load remains on the alternating-current driven set running at low voltage. Under these circumstances the maintenance man will take steps to put the battery set into service as soon as possible. After the battery set is ready for service, key G2 ST is restored to the normal position, as shown on the drawing, to transfer the load to it. This will be made more clear hereinafter.

In the case of high-voltage failure, relay HV1 operates in turn operating relay HVA. Also in the case of dial tone failure ground in the alarm circuit is connected to dial tone failure lead DTF which also operates relay HVA. Relay HVA operated, operates relay CO which locks up through relay RST. The operation of relay CO also establishes a circuit from battery through contact 3 of key G1 ST, contact 3 of relay RST, contact 3 of relay CO, contact 3 of relay B, contact 1 of relay T1 and contact 2 of relay GL and conductor RG into the alarm circuit to bring in a ringing failure alarm in the alarm circuit. Dial tone failure will also light a lamp in the alarm circuit to indicate the condition. Operation of relay CO shuts down the alternating-current driven set and leaves the office without ringing current. In the case of high voltage the alternating-current driven set is shut down as the voltages may get sufficiently high due to tube trouble in the electronic voltage regulator to cause damage to the office circuits. In case of dial tone failure the office will not function satisfactorily with loss of dial tone. Immediate steps are taken to restore the battery set to service. After the battery set is ready for service, key G2 ST is restored to its normal position, as shown in Fig. 5, to transfer the load to it. This will be made clear under the next succeeding heading.

To Restore the Circuit to Normal After Running the Battery Set for Maintenance To restore the circuit to normal, after running the battery set for maintenance purposes, key G2 ST is operated to its normal position, as shown in Fig. 5. Under normal operating conditions relay K will be held operated until the end of the code cycle of the battery driven set by ground supplied through contact 2 of the Motor Stop interrupter of the battery driven set, Fig. 4. At the end of the code cycle relay K releases shutting down the battery set by releasing relays RM2, DB2 and so forth. The G2 ST GD lamp remains lighted until the release of the K relay and thus indicates the end of the code period of the battery driven set when the lamp is extinguished. If, when the battery set was being run for maintenance, an alarm had come in due to any failure of the alternating-current driven set, relays LV1 and LV2 would be released. When key G2 ST was restored to the normal position, as shown in Fig. 5, it will release relay B. Relay B released operates relay ST to keep the battery driven set running and operates relays T1, T2 and T3 and transfer relay T to transfer the load to the battery set.

MAINTENANCE ON BATTERY DRIVEN SET WITH POWER OFF THE SET

If, in the course of maintaining the battery set, it is desired to rotate it manually this may be done by means of a crank after fuse Ring M2 has been removed. It is necessary to remove the fuse, otherwise as soon as the interrupter shaft has been turned, so that contact 2 of the Motor Stop interrupter of the battery driven set is closed, the set will start to run and will run for one code cycle and then will stop. The removal of use Ring M2 removes battery from relay GL which releases. Relay GL released connects ground to the winding of relay B to hold relay B operated and prevent an automatic transfer to the battery set. Relay GL released also connects open contact 1 of relay HVA to the RG alarm lead. On occasions, the battery driven ringing generator set is physically removed and the connections to the battery driven set are opened. The ground connection from the battery driven motor DCM in Fig. 3 to lead GL is disconnected by removal of the set, releasing relay GL. This is effective to release relay GL even though fuse Ring M2 remains in position.

ALARMS AFTER TRANSFER TO BATTERY DRIVEN SET

When the load is on the battery driven set, due to an automatic or manual transfer, a low-voltage condition will release relays LV1 and LV2. As relay T1 is operated, a circuit may be traced from ground through contact 1 of relay LV2, contact 5 of relay T1, delay thermistor TT, winding of relay HVA, contact 3 of relay RST and contact 3 of key G1 ST to battery operating relay HVA. With relay HVA operated a circuit is established from battery through contact 3 of key G1 ST, contact 3 of relay RST, contact 1 of relay HVA and contact 2 of relay T1 which extends into the alarm circuit over conductor RG to bring in a ringing failure alarm. Similarly, a high-voltage condition will operate relay HV1 and in turn relay HVA, which establishes the same alarm circuit, to bring in the ringing failure alarm.

OPERATION WITH DYNAMIC BRAKING FUSE BLOWN

Fuses are provided, in series with the dynamic braking resistances DBR and DBRM, to open the braking circuit in case the resistances are left connected to the generators by the accidental operation of relay DB1 or DB2 or the sticking of contacts on these relays while the generators are running. The resistances used are of relatively low wattage, due to the fact that they are required to carry current normally for only a fraction of a second. If the resistances were of sufficient wattage to allow them to remain connected to the ringing machine, when the ringing machine is normally running, they would have to be of extremely high wattage and would absorb a large percentage of the output of the ringing machine. If the fuses connected in series with the dynamic braking resistances are blown, fuse alarms, not shown, will be brought in. If the fuse connected in series with dynamic braking resistor DBR, associated with the alternating-current driven set, should be blown, it will not prevent automatic transfer to the battery driven set in the usual manner under conditions of power failure, dial tone failure, low voltage or high voltage. With power restored, the alternating-current driven set will not stop at its end-of-code position but merely slow down and then restart as contact 2 associated with the motor stop cam of the alternating-current driven set recloses. When the Motor Hold interrupters on both machines are in synchronism, which may take several minutes, the load will be transferred to the alternating-current driven set and the battery driven set will shut down in the usual manner. The normal transfer will also take place under low or high-voltage conditions leaving the alternating-current driven set running if the transfer were due to low voltage, or stopped if due to high voltage, due to the operation and locking of relay CO. The blown fuse DBR should be replaced before transferring back to the alternating-current driven set.

If fuse DBRM should become blown, normal transfer to the battery set will take place in the usual manner under conditions of power failure, dial tone failure, low or high voltage. Also, normal transfer back to the alternating-current driven after power failure or transfer by operating key RST will take place. However, the battery set will continue to run as there is no dynamic braking. The battery driven set may stop after some time if the Motor Hold interrupter does not go off its cam as the set slows down at the end of each code cycle. The blown fuse DBRM should be replaced.

What is claimed is:

1. A first generator, a second generator, a first power source connected to said first generator for driving said first generator; a second power source for driving said second generator, a load circuit connected to said first generator, a transfer circuit, first switching elements in said transfer circuit responsive to the complete failure of said first power source for connecting said second power source to said second generator, second switching elements in said transfer circuit responsive to said failure for connecting said second generator to said load circuit, third switching elements in said transfer circuit responsive to the restoration of said first power source for reconnecting said first generator to said load circuit, fourth switching elements in said transfer circuit responsive to an abnormal change in voltage of said first generator for disconnecting said first generator from said load circuit, and a control connected to said fourth switching means for thereafter preventing the automatic connection of said first generator to said load.

2. A transfer circuit having switching elements for governing the operative connection of one or the other of two generators to a common load circuit, a first control for said elements responsive to the complete failure of power supply for a first of said generators for connecting a second of said generators to said load circuit, a second control for said elements responsive to the restoration of said power supply for reconnecting said first generator to said load circuit, a third control for said elements responsive to abnormal voltage delivered by said first generator to said load circuit for connecting said second generator to said load circuit and a fourth control for said elements for preventing the automatic reconnection of said first generator to said load circuit when failure is caused by abnormal voltage of said first generator.

3. A first and a second generator, a load circuit, a transfer circuit connectable to said generators, means in said transfer circuit responsive to abnormal voltage output of said first generator for automatically transferring said load circuit from said first to said second generator, means in said transfer circuit responsive to the restoration of power service after a complete failure of power service for automatically retransferring said load circuit from said second generator to said first generator, and means in said transfer circuit responsive to a transfer of said load circuit from said first generator to said second generator due to abnormal voltage for preventing an automatic retransfer of said load circuit from said second generator to said first generator.

4. In a communication system, a load circuit, a first ringing generator, means connected to said generator for transmitting a sequence of ringing signals according to a predetermined ringing code, a second ringing generator, automatic transfer means responsive to abnormal output of said first ringing generator for transferring said second ringing generator to said load circuit, other automatic means responsive to the reoperation of said first generator for running said first generator to its end of ringing code position, and switching means for automatically reconnecting said first generator to said load circuit at its end of ringing code position, to prevent mutilation of ringing codes.

5. In a communication system, a first and a second ringing generator set, means on each of said sets for transmitting a predetermined cycle of code ringing signals, a load circuit, means for automatically transferring said load circuit from said first set to said second set responsive to failure of power for driving said first set and automatic means, responsive to the restoration of power to said first set for retransferring said load circuit to said first set when both of said sets are at the end of their ringing code cycle positions.

6. In a communication system, a first and a second ringing generator each having means for transmitting ringing signals according to a predetermined ringing code, a load circuit, a common transfer circuit for transferring either of said generators to said load circuit, a dynamic brake for each of said generators, means in said transfer circuit responsive to manually operable control means therein for actuating either of said brakes so as to stop either of said sets in its respective end-of-code cycle position.

7. In a communication system, a first and a second ringing generator, a common load circuit, a common transfer circuit for transferring said load circuit from one to another of said generators, a first automatic control for said transfer circuit responsive to the failure of power service to one of said generators, a second control for said transfer circuit responsive to abnormally high voltage from either of said generators, a third control for said transfer circuit, responsive to abnormally low voltage from either of said generators, means for transmitting code ringing signals from each of said generators according to a predetermined ringing code cycle and means for preventing the operation of said transfer circuit so as to connect said load circuit to either of said generators except when both of said generators are at their respective end-of-code cycle positions to prevent mutilation of ringing code signals.

8. In a communication system, a first and a second ringing generator set, a load circuit, a transfer circuit, automatic control means for said transfer circuit responsive to abnormal ringing generator output conditions for transferring said load circuit from one to another of said generator sets, manual control means for said transfer circuit for operating either of said generator sets for maintenance while the other of said sets is connected to said load circuit and means in said transfer circuit for preventing an automatic transfer in response to an abnormal condition when one of said sets is being operated in response to said manual control.

9. In a communication system, a first and a second ringing generator, a load circuit, a transfer circuit, automatic controls for said transfer circuit responsive to abnormal generator output for transferring said load circuit from said first to said second generator, manual controls for said transfer circuit for operating said second generator for maintenance while said first generator is connected to said load circuit, and a disabling circuit for said transfer circuit to prevent automatic connection of said second generator to said load in response to an abnormal condition of said first generator while said second generator is being operated for maintenance.

10. In a communication system, a first and a second ringing generator each having an individual output circuit, a first and a second tone generator each having an individual output circuit, a transfer circuit, a common load circuit, first switching elements in said transfer circuit responsive to an abnormal voltage condition of said first ringing generator for transferring said common load circuit from said first to said second ringing generator output circuit, second switching elements in said transfer circuit responsive to an abnormal voltage condition of said first tone generator for transferring said common load circuit from said first to said second tone generator output circuit.

11. A system in accordance with claim 10 in which said first switching elements are responsive to abnormally high and low voltage of said ringing generator to effect said transfer and said second switching elements are responsive to abnormally low voltage of said tone generator to effect said transfer.

12. In a communication system, a first and a second code ringing generator, a common load circuit, a transfer circuit for selectively connecting said generators to said load circuit, a voltage regulator for said first generator, a space discharge device having a filament circuit in said regulator, switching means in said transfer circuit responsive to power failure for transferirng said load circuit from said first to said second generator, a time delay circuit in said transfer circuit, means responsive to the restoration of power for heating said filament circuit during an interval predetermined by said delay circuit, means in said transfer circuit responsive to said time delay circuit for thereafter operating said first generator to its end-of-code cycle position and means in said transfer circuit responsive to said operation for retransferring said load circuit from said second to said first generator.

JOHN K. MILLS.
WALTER S. ROSS.

References Cited in the file of this patent

UNITED STATES PATENTS

| Number | Name | Date |
|---|---|---|
| 1,945,665 | Stewart | Feb. 6, 1934 |
| 2,008,408 | Thompson | July 16, 1935 |
| 2,302,535 | Dyrbin | Nov. 17, 1942 |
| 2,316,730 | Wallace | Apr. 13, 1943 |
| 2,468,135 | Taliaferro | Apr. 26, 1949 |
| 2,517,575 | Kelly | Aug. 8, 1950 |